United States Patent [19]

Auerbach et al.

[11] Patent Number: 5,206,308
[45] Date of Patent: * Apr. 27, 1993

[54] GRAFTING OF AMINE FUNCTIONAL POLYMERS ONTO FUNCTIONALIZED OXYMETHYLENE POLYMERS AND THE RESULTING GRAFT POLYMERS THEREOF

[75] Inventors: Andrew B. Auerbach, Livingston; Jerry A. Broussard, Summit, both of N.J.; Nan L. Yang, Staten Island, N.Y.; James L. Paul, Summit, N.J.

[73] Assignee: Hoechst Celanese Corporation, Somerville, N.J.

[*] Notice: The portion of the term of this patent subsequent to Dec. 4, 2007 has been disclaimed.

[21] Appl. No.: 664,436

[22] Filed: Mar. 4, 1991

Related U.S. Application Data

[63] Continuation of Ser. No. 350,821, May 12, 1989, abandoned.

[51] Int. Cl.$^5$ .................. C08F 283/12; C08F 283/06; C08G 77/04; C08L 74/00
[52] U.S. Cl. ..................... 525/410; 525/420; 525/474; 525/415; 525/426; 525/926; 525/927
[58] Field of Search ............... 525/926, 927, 410, 420, 525/425, 426, 474

[56] References Cited

U.S. PATENT DOCUMENTS

| | | |
|---|---|---|
| 2,959,565 | 4/1960 | Stanton et al. ............ 525/426 |
| 2,993,025 | 7/1961 | Alsup et al. ............... 525/927 |
| 3,567,690 | 3/1971 | Pregaglia et al. ......... 525/410 |
| 3,960,984 | 6/1976 | Kohan ....................... 525/927 |
| 4,098,843 | 7/1978 | Johnson ..................... 525/154 |
| 4,363,894 | 12/1982 | Locatelli ................... 525/426 |
| 4,666,995 | 5/1987 | Auerbach et al. ......... 525/927 |
| 4,677,156 | 6/1987 | Müssig et al. ............. 525/425 |
| 4,744,934 | 5/1988 | Christy ..................... 525/927 |
| 4,900,783 | 2/1990 | Yang et al. ................ 525/412 |
| 4,906,728 | 3/1990 | Yang et al. ................ 528/249 |
| 4,975,518 | 12/1990 | Broussard et al. ........ 528/230 |
| 4,975,519 | 12/1990 | Yang et al. ................ 528/230 |
| 4,983,708 | 1/1991 | Yang et al. ................ 528/230 |
| 5,004,798 | 4/1991 | Broussard et al. ........ 528/230 |
| 5,034,499 | 7/1991 | Yang et al. ................ 528/250 |
| 5,071,952 | 12/1991 | Yang et al. ................ 528/249 |

FOREIGN PATENT DOCUMENTS

| | | |
|---|---|---|
| 682750 | 3/1964 | Canada ....................... 525/426 |
| 855678 | 11/1970 | Canada ....................... 525/426 |
| 0194889 | 9/1986 | European Pat. Off. ..... 525/426 |
| 2173126 | 10/1973 | France . |
| 7105217 | 3/1967 | Japan ......................... 525/426 |

Primary Examiner—James J. Seidleck
Assistant Examiner—W. R. H. Clark
Attorney, Agent, or Firm—Nixon & Vanderhye

[57] ABSTRACT

Novel oxymethylene graft polymers are obtained by grafting, via Michael addition, an amine functional polymer onto an oxymethylene backbone having pendant acrylate or substituted acrylate ester groups serving as reactive sites for the graft reaction.

12 Claims, No Drawings

GRAFTING OF AMINE FUNCTIONAL POLYMERS ONTO FUNCTIONALIZED OXYMETHYLENE POLYMERS AND THE RESULTING GRAFT POLYMERS THEREOF

This is a continuation of application Ser. No. 07/350,821, filed May 12, 1989, now abandoned.

FIELD OF INVENTION

The present invention relates generally to grafting of amine functional polymers (e.g., polymers having amine functionality in the polymer chain or in a side chain) onto a functionalized polyacetal backbone (i.e., a polymer backbone having recurring —CH$_2$O— units and side chain or pendant acrylate or substituted acrylate ester groups), and to the resulting graft copolymers thereby obtained.

BACKGROUND AND SUMMARY OF THE INVENTION

Oxymethylene polymers represent an important class of engineering resins due to numerous favorable physical properties. For this reason, oxymethylene polymers have a wide range of commercial applications, for example, as parts for automobiles, as plumbing components and a variety of household and personal products.

It is oftentimes desireable to modify one or more of the inherently advantageous physical properties of oxymethylene polymers so as to meet the needs of specific end-use applications. Normally, to achieve such modified properties, oxymethylene polymers are usually blended with a variety of other resins and/or ingredients (e.g., impact modifying agents, flame retardants, light and heat stabilizers, fillers, and the like). Usually the blending of property-modifying agents with oxymethylene polymers is not without its own problems due principally to the highly crystalline nature of oxymethylene polymers which is evident in a low level of compatibility with other polymers.

For example, it has been proposed in U.S. Pat. No. 2,993,025 issued to Alsup et al on Jul. 18, 1961 (the entire content of which is expressly incorporated hereinto by reference) to blend superpolyamides with polyoxymethylene so as to provide a composition exhibiting improved thermal stability characteristics. However, when polyamides are blended with oxymethylene polymers, formation of so-called "black specks" usually occurs. To combat the deleterious formation of black specks, it has been suggested to incorporate polyamides having a melting or softening point below that of the oxymethylene polymer by adding the polyamide to the oxymethylene polymer as a dispersion of the polyamide in a carrier resin which is inert to the oxymethylene polymer (see U.S. Pat. No. 4,666,995 issued to Auerbach et al on May 19, 1987, the entire content of which is expressly incorporated hereinto by reference).

Grafting of amine functional polymers onto an oxymethylene backbone would present an attractive alternative to blending so as to achieve a block copolymer having the desired modified properties and/or to employ such a graft copolymer as a compatibilizing agent for compositions containing a blend of oxymethylene polymer and the amine functional polymer per se. However, with oxymethylene polymers, grafting is usually not possible due to the low level of polyacetal end group functionality—that is, since each oxymethylene molecule carries a maximum of two functional groups, e.g., hydroxyl end groups.

According to the present invention, however, grafting of amine functional polymers onto oxymethylene backbones is accomplished by increasing the reactive sites on the oxymethylene polymers. That is, the oxymethylene polymers employed in the present invention will exhibit increased functionality, in the form of reactive pendant groups (e.g., acrylate or substituted acrylate ester groups). Hence, these functionalized oxymethylene polymers may be reacted with suitable amine functional polymers so as to obtain the graft polymers of this invention.

The preferred oxymethylene polymer backbones onto which the amine functional polymers are grafted are essentially random copolymers containing oxymethylene units interspersed with higher oxyalkylene units having pendant acrylate or substituted acrylate ester groups. These pendant functional groups of the higher oxyalkylene units therefore provide reactive sites for the grafting of amine-terminated polymers onto the oxymethylene backbone.

The novel graft polymers of this invention may find usefullness as an engineering resin per se (i.e., resins in which thermal stabilizing agents—the amine functional polymers—are chemically bound to the oxymethylene backbone) and/or as compatibilizing agents so as to compatibilize blends of oxymethylene polymers and the same or chemically similar polymers as are bound to the oxymethylene backbone, and/or as polymer modifiers and additives.

Further aspects and advantages of this invention will become more clear after consideration is given to the following detailed description thereof.

DETAILED DESCRIPTION OF THE PREFERRED EXEMPLARY EMBODIMENTS

Among the oxymethylene polymers which may be satisfactorily employed as the backbone in the graft polymers of this invention are oxymethylene copolymers having recurring units represented by the following Formulas I, II, and III:

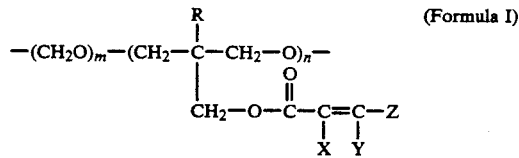

where R is alkyl; X is H or alkyl; Y and Z, which may be the same or different are H, alkyl, or aryl; m and n are each integers such that m+n is between 5 and 20,000 and the ratio of units of subscript m to the units of subscript n is between 1:1 and 1000:1

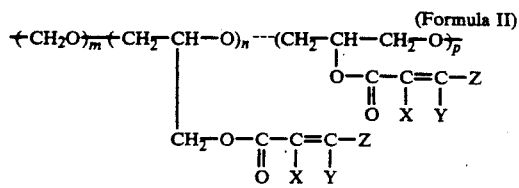

where X is H or alkyl; Y and Z, which may be the same or different, are H, alkyl, or aryl; m, n, and p are each integers such that m+n+p is between 5 and 20,000 and the ratio of units of subscript m to the units of subscript n+p is between 1:1 and 1000:1; or

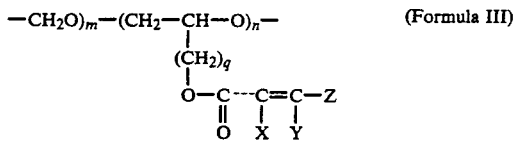  (Formula III)

where X is H or alkyl; Y and Z, which may be the same or different are H, alkyl, or aryl; q is an integer between 1 and 4; m and n are each integers such that m+n is between 5 and 20,000 and the ratio of units of subscript m to the units of subscript n is between 1:1 and 1000:1.

Generally, the oxymethylene copolymers represented by Formulas I–III above may be prepared by the cationic copolymerization of trioxane with cyclic formals having pendant acrylate or substituted acrylate ester groups. The pendant acrylate or substituted acrylate ester groups are essentially unreactive under polymerization conditions (i.e. they are "protected") and thus survive the copolymerization process so as to provide reactive sites for grafting of polyamides according to this invention. The reader's attention is directed to the following copending and commonly owned patent applications which more fully describe the preferred oxymethylene copolymers which may be used as the backbone of the graft polymers according to this invention: U.S. Ser. No. 07/350,799 filed on May 12, 1989 (now U.S. Pat. No. 5,004,789) in the names of Jerry A. Broussard et al and entitled "Novel Polyacetal Copolymers of Trioxane and Trimethylolpropane Formal Derivatives"; U.S. Ser. No. 07/350,782 filed on May 12, 1989 (now U.S. Pat. No. No. 4,983,708) in the names of Nan Loh Yang et al and entitled "Novel Polyacetal Copolymers of Trioxane and Glycidyl Ester Derivatives"; U.S. Ser. No. 07/350,781 filed on May 12, 1989 (now U.S. Pat. No. 4,975,519) in the names of Jerry A. Broussard et al and entitled "Novel Polyacetal Terpolymers of Trioxane and α,α- and α,β-Isomers of Glycerol Formal and Functional Derivatives Thereof"; and U.S. Ser. No. 07/350,791 filed on May 12, 1989 (now U.S. Pat. No. 4,975,518) in the names of Jerry A Broussard et al, entitled "Novel Polyacetal Copolymers of Trioxane and 1,2,6-Hexanetriol Formal Derivatives", the entire content of each of these copending and commonly owned applications being expressly incorporated hereinto by reference.

Monomers other than trioxane and cyclic formals having pendant acrylate or substituted acrylate esters groups as described in the above-mentioned copending U.S. applications may also be employed so as to form oxymethylene terpolymers or tetrapolymers—that is, polymers having units in the chain derived from trioxane, cyclic formals having pendant acrylate or substituted acrylate esters groups, and other monomer(s) which may be employed. In general, these additional monomers that may be employed are cyclic ethers and cyclic acetals with ethylene oxide, 1,3-dioxolane, 1,3-dioxepane, 1,3-dioxep-5-ene, and 1,3,5-trioxepane being particularly preferred.

As used herein and in the accompanying claims, the term "copolymer" is intended to encompass any polymer having, as at least part of the polymer chain, structural units derived from trioxane and cyclic formals or their functionalized derivatives. Thus, the term "copolymer" as used herein and in the accompanying claims to describe the oxymethylene backbones useable in this invention is intended to encompass terpolymers, tetrapolymers, and the like which include structural units in the polymer chain derived from trioxane and cyclic formals or their functionalized derivatives, in addition to other units derived from trioxane and cyclic formals having pendant acrylate or substututed acrylate esters groups, in addition to other units derived from, e.g., the cyclic ether and cyclic acetal monomers described above, if present during polymerization.

Any suitable amine functional polymer may be employed in the practice of the present invention provided that it is capable of reacting with the pendant vinyl functional group of the oxymethylene backbone. As used herein and in the accompanying claims, the term "amine functional polymer" is intended to refer to any polymer having a primary or secondary amine group in the polymer chain, or in a side chain, which is reactive under Michael addition conditions. Thus, for example, suitable amine functional polymers may include: Nylon 4,6; Nylon 6,6; Nylon 6,8; Nylon 6,9; Nylon 6,10; Nylon 6,12; Nylon 6,I; Nylon 6,T; Nylon 6; Nylon 11; Nylon 12; polyamidoamines; amine functional polysiloxanes; and mixtures and copolymers of the same.

One particular class of amine functional polymers which may be employed in forming the graft copolymers of this invention are polyamides which can vary widely in composition and molecular weight. Preferably, the polyamides are selected from the many macromolecular polyamides known in the art in which carboxamide linkages of the following Formula IV:

 (Formula IV)

form an integral part of the polymer chain and which upon hydrolysis yield monomeric compounds selected from (1) mixtures of dicarboxylic acids and diamines and (2) omega-aminomonocarboxylic acids, (3) mixtures of dicarboxylic acids, diamines, and omega-aminomonocarboxylic acids. The polyamides preferably have carboxamide linkages in which R is hydrogen, or alkyl. The molecular weight of the polyamides can vary widely, with degrees of polymerization ranging from 10 to 500. The preferred polyamides will also be characterized in that they include at least one primary or secondary amine group, preferaby an amine end group or side chain group, and are thus capable of reacting with the pendant acrylate or substituted acrylate ester groups attached to the oxymethylene polymer backbone.

The preferred polyamides useable according to this invention are commercially available, for example, from DuPont under the registered trademark Elvamide ®. Particularly preferred is Elvamide 8066, which is a terpolymer of Nylon 6/6, 6, and 12, having a melting point of about 105° C. to 125° C., and a relative viscosity of between 21 and 29.

Another particular class of amine functional polymers which may be employed in forming the graft copolymers of this invention are polyamidoamines. The preferred polyamidoamine useable according to this invention is commercially available, for example from Henkel Co. under the registered trademark Genamid ®.

Another class of amine functional polymers which may be employed in forming the graft copolymers of this invention are amine functional polysiloxanes having siloxane repeat units of the formula:

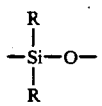

where R is alkyl, substitued alkyl, or aryl.

The preferred amine functional polysiloxanes have terminal amine functionality with a polymer chain consisting of polydimethylsiloxane units, polydiphenylsiloxane units, polymethylphenylsiloxane units, or mixtures of these units. The preferred amine functional polysiloxane is an aminopropyldimethylsiloxane terminated polydimethylsiloxane commercially available from Petrarch Systems and designated PS513 represented by the formula:

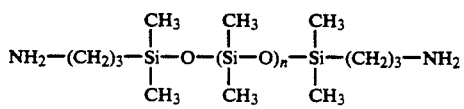

where n is an integer from 10 to 1000.

The amine functional polymers may be grafted onto the oxymethylene polymer backbone via the well known Michael addition reaction. A general example of this addition is shown below for an oxymethylene polymer (POM) with pendant acrylate ester functionality and an amine functional polyamide (PA).

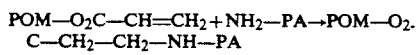

Preferred techniques for effecting reaction conditions sufficient to graft the amine functional polymers onto the oxymethylene polymer according to this invention are believed to be well within the skill of those in this art. For example, the amine functional and oxymethylene polymers may be introduced into a conventional extruder operating under conditions sufficient to allow the graft reaction. Alternately, the amine functional and oxymethylene polymers may be reacted together in a solvent in a batch or continuous mode to effect grafting.

Grafting conditions are chosen to maximize the grafting reaction while minimizing polymer degradation. In the case of solution grafting of the amine functional polymers and oxymethylene polymers employed in the present invention, a reaction temperature of less than about 170° C. is preferred. In the case of melt grafting (e.g. in an extruder) higher temperatures and shorter residence times would generally be required to effect grafting. In addition, the oxymethylene polymers should have a relatively high degree of functionality—that is the pendant acrylate ester groups should be present in an amount greater than about 1 mole % and preferably in an amount greater than about 5 mole % based on the oxymethylene polymer.

Further aspects and advantages of this invention will become clear from the following non-limiting Examples.

EXAMPLE I

A. Preparation of Polyamide

A commercially available polyamide (Elvamide® 8066, DuPont) having an amine end group and an carboxyl end group was reacted with phenethylamine so as to convert the carboxyl end group to an amide group. 10 grams of the polyamide and 3 grams of phenethylamine were placed in a 100 ml round bottom flask with a magnetic stirrer and 50 ml of DMSO (dimethylsulfoxide) as solvent. The mixture was refluxed at 180° C. to 190° C. for about two hours under stirring conditions. The mixture was then cooled to room temperature, and filtered to remove the solvent and un-reacted phenethylamine. The polyamide was then washed three times with acetone and dried under vacuum at room temperature. The resulting polyamide (yield=95%) had an amine and an amide end group.

B. Grafting Reaction

An oxymethylene copolymer of Formula I above where R was $C_2H_5$ and X, Y, and Z were each H, having 2.0–2.5 mole percent incorporation of the monomer unit (acrylate ester of 5-ethyl-5-hydroxymethyl-1,3-dioxane) and between 30 to 40% of the double bond surviving after basic hydrolysis was employed as the polymer backbone. 1.0 gram of this oxymethylene copolymer and 0.3 grams of the amide end-capped polyamide from A above, were added to a 30 ml round bottom flask, with 10 ml of DMSO as solvent. The mixture was preheated to between 160° C. and 170° C., and the reaction was allowed to proceed for between 30 to 50 minutes under stirring conditions. The oxymethylene copolymer precipitated when the reaction mixture was cooled to between 110°–120° C. whereas the polyamide precipitated at about 40°–50° C. Therefore, the reaction mixture was filtered at about 70°–80° C. and washed with hot DMSO three times to completely remove the unreacted polyamide. The resulting graft polymer was then washed with acetone to remove the DMSO and dried under vacuum at about 55° C. overnight.

$^1$H NMR analysis confirmed that the graft copolymer contained about 10 to about 15 percent by weight of the polyamide grafted onto the oxymethylene backbone.

EXAMPLE II

Example I above was repeated using the oxymethylene copolymers, polyamide (Elvamide® 8066), and reaction conditions identified in Table 1 below. The results appear in Table 2 below. As is evident, the polyamide was grafted onto the oxymethylene polymer backbones in amounts in excess of 3.0 weight percent, based on the total weight of the graft polymer.

TABLE 1

| | OXYMETHYLENE COPOLYMER | | | REACTION CONDITIONING | | | |
|---|---|---|---|---|---|---|---|
| SAMPLE NO. | MONOMER INCORPORATED (mol %) | DOUBLE BONDS (mol %) | MOLECULAR WEIGHT (MW)** | OMCP** (g) | POLYAMIDE (g) | DMSO (ml) | TEMP/TIME (c/hr) |
| 1 | 1.95 | 0.90 | 64,000 | 1.0 | 0.5 | 7 | 170/2 |
| 2 | 1.95 | 0.90 | 64,000 | 1.0 | 0.5 | 7 | 170/3 |
| 3 | 3.35 | 0.54 | 64,000 | 1.0 | 0.5 | 6 | 170/2 |

TABLE 1-continued

| | OXYMETHYLENE COPOLYMER | | | REACTION CONDITIONING | | | |
|---|---|---|---|---|---|---|---|
| SAMPLE NO. | MONOMER INCORPORATED (mol %) | DOUBLE BONDS (mol %) | MOLECULAR WEIGHT (MW)** | OMCP** (g) | POLYAMIDE (g) | DMSO (ml) | TEMP/TIME (c/hr) |
| 4 | 3.02 | 1.20 | 17,000 | 0.7 | 0.7 | 7 | 170/2 |
| 5 | 3.22 | 1.25 | 17,000 | 0.7 | 0.7 | 7 | 170/2 |
| 6 | 3.08 | 1.92 | 21,000 | 0.72 | 0.72 | 7 | 170/2 |

**OMCP = oxymethylene copolymer
*Determined from Viscosity

TABLE 2

| | | Polyamide Content | |
|---|---|---|---|
| Sample No. | Yield (%)* | Mole % | Wt. % |
| 1 | 92.0 | 2.45 | 3.42 |
| 2 | 82.0 | 2.42 | 3.38 |
| 3 | 80.0 | 2.43 | 3.40 |
| 4 | 100.0 | 9.75 | 13.22 |
| 5 | 71.4 | 5.96 | 8.21 |
| 6 | 82.8 | 6.72 | 9.23 |

*Based on Oxymethylene Copolymer

EXAMPLE III

Trioxane and glycerol formal methacrylate (GFM) were copolymerized in the manner described in U.S. Pat. No. 4,975,519 to obtain oxymethylene copolymers used in this Example III (i.e., copolymers of Formula II where X is $CH_3$, and Y and Z are each hydrogen). These oxymethylene copolymers were then reacted with polyamide (Elvamide ® 8066) in the quantities and under the reaction conditions shown in Table 3 below. The results of this Example III are also shown in Table 3.

TABLE 3

| | Oxymethylene Copolymer | | Polyamide | | Solvent DMA* | Reaction Conditions | RESULTS | | |
|---|---|---|---|---|---|---|---|---|---|
| Sample No. | (g) | (mmol.) | (g) | (mmol.) | (ml) | (c/hr)) | Yield** (%) | Polyamide Conc.*** | |
| | | | | | | | | Mol. % | Wt. % |
| 12 | 0.5 | 0.27 | 1.0 | 0.25 | 5 | 170/2 | 84 | 4.7 | 6.5 |
| 13 | 0.5 | 0.27 | 1.5 | 0.37 | 5 | 170/1.5 | 81 | 4.2 | 5.8 |
| 14 | 0.5 | 0.27 | 1.0 | 0.25 | 5 | 170/4 | 81 | 4.5 | 6.2 |

*DMA (dimethylacetamide)
**Bases on Oxymethylene Copolymer
***Based on H NMR Analysis

EXAMPLE IV

Example III was repeated except that the oxymethylene copolymer that was employed was obtained by copolymerizing trioxane with glycerol formal crotonate. The copolymer obtained had a structure according to Formula II where Y is $CH_3$, and X and Z are each hydrogen. 0.50 gram (0.16 mmol.) of the resulting oxymethylene copolymer was reacted at 170° C. for 4 hours with 1.0 gram (0.25 mmol.) of polyamide (Elvamide ® 8066) in the presence of 5 ml of DMA (dimethylacetamide) as a solvent. The resulting graft polymer yield was 86% (based on the oxymethylene copolymer) and had 4.2 mole percent (5.8 weight percent) of polyamide (based upon $^1$H NMR analysis) grafted onto the oxymethylene copolymer backbone.

EXAMPLE V

Trioxane and trimethylolpropane formal acrylate were copolymerized in the manner described in U.S. Pat. No. 5,004,789 to obtain an oxymethylene copolymer used in this Example V (i.e., a copolymer according to Formula I where R is $C_2H_5$, and X, Y, and Z are each hydrogen). 0.50 gram (0.22 mmol.) of this oxymethylene copolymer was then reacted with 1.0 gram (0.25 mmol.) of a polyamidoamine (Genamid ® 250, Henkel Co.). The oxymethylene copolymer and Genamid ® 250 were reacted at 170° C. for 1.5 hours in DMSO. $^1$H NMR spectrum of the resulting polymer showed the presence of the Genamid ® 250 grafted onto the oxymethylene backbone, with an estimated double bond reaction with the polyamidoamine in an amount of about 70 mole percent.

EXAMPLE VI

An oxymethylene copolymer obtained by copolymerizing trioxane and glycerol formal methacrylate in the manner described in Example III (i.e., a copolymer according to Formula II where X is $CH_3$ and Y and Z are each hydrogen) was reacted with Genamid ® 250 polyamide. The reaction was carried out at 170° C. for 2 hours in DMSO. $^1$H NMR analysis clearly revealed the presence of the polyamide grafted onto the oxymethylene backbone, with an estimated double bond reaction in the amount of about 35 mole percent.

EXAMPLE VII

An oxymethylene copolymer was synthesized by reacting trimethylolpropane formal acrylate with trioxane (i.e., a copolymer according to Formula I, where R is $C_2H_5$, and X, Y, and Z are each H) in the manner described in U.S. Pat. No. 5,004,789. The resulting oxymethylene copolymer was then placed in 10 ml of dimethylformamide (DMF) contained in a 50 ml flask equipped with a magnetic stirrer and an air cooled, straight through condenser. The flask was heated to 150° C. in an oil bath to dissolve the oxymethylene copolymer. A solution of an aminopropyldimethylsiloxane terminated polydimethylsiloxane (Petrarch, PS513) in 5 ml of p-xylene was added to the flask. The reaction mixture was stirred and refluxed at 170° C. for 1 hour. The solution was cooled to precipitate the grafted polymer. The solid was then filtered and washed with toluene (20 ml) at 100° C. and twice with acetone at ambient temperature. The resulting polymer was then dried under vacuum at 40° C. for 30 minutes. The $^1$H NMR spectrum confirmed that about 19.8% of the amine functional polydimethylsiloxane had been grafted onto the oxymethylene copolymer backbone.

EXAMPLE VIII

Example VII was repeated except that the solvent system employed was a mixture of dimethylformamide (DMF) and m-cresol, and the reaction conditions employed were 165° C. for 1 hour. $^1$H NMR spectrum confirmed that about 12.6% of the amine functional polydimethylsiloxane had been grafted onto the oxymethylene copolymer backbone.

EXAMPLE IX

Example VII was repeated except that the solvent system employed was toluene and the reaction conditions were 110° C. for two hours. The oxymethylene polymer was not completely soluble under these conditions. The $^1$H NMR spectrum confirmed that about 5% of the amine functional polydimethylsiloxane had been grafted onto the oxymethylene copolymer backbone.

EXAMPLE X (Comparative)

Example VII was repeated except that the solvent employed was dimethylformamide (DMF) and the reaction conditions were 160°. No grafting was evident on $^1$H NMR spectrum.

EXAMPLE XI

The oxymethylene copolymer used in Example VII above was similarly used in this Example XI. Nylon-6 (0.3 g.) and m-cresol (14 ml) were placed in a 50 ml flask equipped with a magnetic stirrer and an air-cooled, straight-through condenser. The flask was heated to 140° C. for 1 hour in an oil bath to dissolve the nylon-6. The oxymethylene copolymer (1 g.) was then added directly into the flask and the reaction mixture was stirred and heated at 140° C. for 1 hour. The solution was cooled to precipitate out the solid polymer, which was filtered and washed with o-chlorophenol. The polymer was then filtered and washed twice with acetone, was filtered again and dried at 40° C. $^1$H NMR spectrum confirmed that about 10 mole % of the nylon-6 had been grafted onto the oxymethylene copolymer backbone.

EXAMPLE XII

The oxymethylene compolymer used in Example VII above was similarly used in this Example XII. A polyamide (0.6 g.; Elvamide ® 8066) and o-chlorophenol (10 ml) were placed in a 50 ml flask equipped with a magnetic stirrer and an air-cooled, straight-through condenser. The flask was heated to 135° C. for 1 hour in an oil bath to dissolve the polyamide. The oxymethylene copolymer (1 g.) was then added directly into the flask and the reaction mixture was stirred and heated at 135° C. for 1 hour. The solution was cooled to precipitate out the solid polymer, which was filtered and washed with o-chlorophenol. The polymer was then filtered and washed twice with acetone, was filtered again and dried at 40° C. $^1$H NMR spectrum confirmed that about ten amide repeat units per about ninety trioxane units had been grafted onto the oxymethylene backbone.

EXAMPLE XIII

An oxymethylene copolymer was synthesized by reacting trimethylolpropane formal acrylate and 1,3-dioxep 5-ene with trioxane in the manner described in U.S. Pat. No. 5,004,798. The resulting oxymethylene copolymer was reacted with an amine functional polydimethylsiloxane (Petrarch PS-513) following the procedure described in Example VII. The solvent system used was a mixture of dimethylformamide and m-cresol and the reaction conditions employed were 175° C. for 1 hour. $^1$H NMR spectrum confirmed that about 7.8% of the amine functional polydimethylsiloxane had been grafted onto the oxymethylene copolymer backbone.

EXAMPLE XIV

Example XIII was repeated except that the solvent system employed was a mixture of DMF and xylene and the reaction conditions employed were 150° C. for 1 hour. $^1$H NMR spectrum confirmed that about 2% of the amine functional polydimethylsiloxane had been grafted onto the oxymethylene copolymer backbone The above Examples demonstrate that amine functional polymers may be grafted onto oxymethylene polymers in significant quantities. Thus, the novel polymers of the invention permit amine functional polymers to be chemically bound to oxymethylene polymers, particularly oxymethylene copolymers having pendant acrylate or substituted acrylate ester functionality so as to be useful as modified resins per se, as additives and modifiers of oxymethylene polymers, or as compatibilizers in the blending of oxymethylene polymers with other polymers.

While the invention has been described in connection with what is presently considered to be the most practical and preferred embodiment, it is to be understood that the invention is not to be limited to the disclosed embodiment, but on the contrary, is intended to cover various modifications and equivalents included within the spirit and scope of the appended claims.

What is claimed is:

1. An oxymethylene graft polymer comprising (i) a polyoxymethylene backbone having pendant acrylate or substituted acrylate ester functional groups, and (ii) an amine functional polymer grafted onto said polyoxymethylene backbone via said acrylate or substituted acrylate ester functional groups, and wherein said polyoxymethylene backbone is selected from oxymethylene copolymers having recurring units represented by the following Formulas I, II and III:

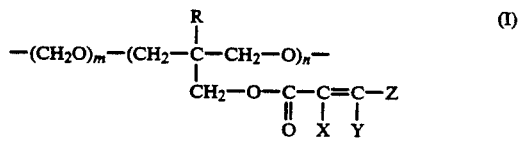

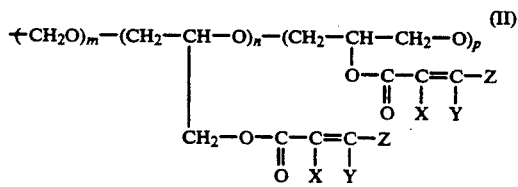

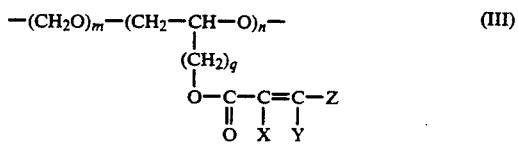

where R is alkyl; X is H or alkyl; Y and Z, which may be the same or different are H, alkyl, or aryl; q is an integer between 1 and 4; and m, n and p are each integers such that m+n or m+n+p is between 5 and 20,000 and the ratio of units of subscript m to the units of subscript n or units of subscript n+p is between 1:1 and 1000:1.

2. An oxymethylene graft polymer as in claim 1, wherein the amine functional polymer is a polyamide having carboxamide linkages represented by the formula:

which linkages form an integral part of the polyamide chain and which upon hydrolysis yield monomeric compounds selected from (1) mixtures of dicarboxylic acids and diamines, (2) omega-aminomonocarboxylic acids and (3) mixtures of dicarboxylic acids, diamines and omega-aminomonocarboxylic acids, and in which R is hydrogen or alkyl.

3. An oxymethylene graft polymer as in claim 2, wherein said polyamide has a degree of polymerization of between about 10 to about 500.

4. An oxymethylene graft polymer as in claim 1, wherein said amine functional polymer is a polyamidoamine having carboxamide linkages represented by the formula:

where R is hydrogen or alkyl, and amine linkages represented by the formula:

which linkages form an integral part of the polyamide chain.

5. An oxymethylene graft polymer as in claim 1, wherein said amine functional polymer is a polysiloxane having repeating siloxane units represented by the formula:

where R is alkyl, substituted alkyl, or aryl.

6. An oxymethylene graft polymer as in claim 1, wherein said amine functional polymer is a polydimethylsiloxane having repeating siloxane units represented by the formula:

7. A method of making an oxymethylene graft polymer comprising grafting an amine functional polymer onto pendant acrylate or substituted acrylate ester functional reactive sites of a polyoxymethylene backbone which is selected from oxymethylene copolymers having recurring units represented by the following Formulas I, II and III:

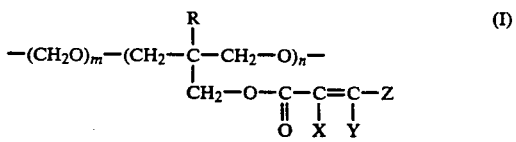

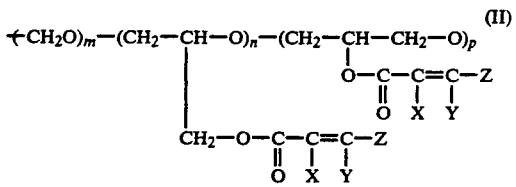

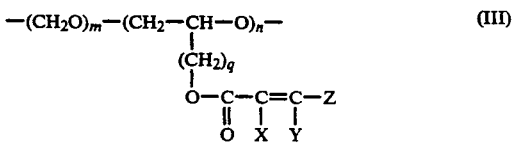

where R is alkyl; X is H or alkyl; Y and Z, which may be the same or different are H, alkyl, or aryl; q is an integer between 1 and 4; and m, n and p are each integers such that m+n or m+n+p is between 5 and 20,000 and the ratio of units of subscript m to the units of subscript n or units of subscript n+p is between 1:1 and 1000:1.

8. A method as in claim 7, wherein the amine functional polymer is a polyamide having carboxamide linkages represented by the formula:

which linkages form an integral part of the polyamide chain and which upon hydrolysis yield monomeric compounds selected from (1) mixtures of dicarboxylic acids and diamines, (2) omega-aminomonocarboxylic acids and (3) mixtures of dicarboxylic acids, diamines and omega-aminomonocarboxylic acids, and in which R is hydrogen or alkyl.

9. A method as in claim 6, wherein said polyamide has a degree of polymerization of between about 10 to about 500.

10. A method as in claim 7, wherein said amine functional polymer is a polyamidoamine having carboxamide linkages represented by the formula:

where R is hydrogen or alkyl, and amine linkages represented by the formula:

which linkages form an integral part of the polyamidoamine chain.

11. A method as in claim 7, wherein said amine functional polymer is a polysiloxane polymer having repeating siloxane units represented by the formula:
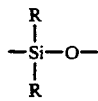
where R is alkyl, substituted alkyl, or aryl.
12. A method as in claim 7, wherein said amine functional polymer is a polydimethylsiloxane polymer having repeating siloxane units represented by the formula:
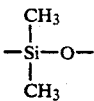
* * * * *

UNITED STATES PATENT AND TRADEMARK OFFICE
CERTIFICATE OF CORRECTION

PATENT NO. : 5,206,308

DATED : April 27, 1993

INVENTOR(S) : Andrew B. AUERBACH et al

It is certified that error appears in the above-identified patent and that said Letters Patent is hereby corrected as shown below:

Column 6, line 10, after "and" change "an" to --a--.

Signed and Sealed this

Eleventh Day of January, 1994

*Attest:*

BRUCE LEHMAN

*Attesting Officer*     *Commissioner of Patents and Trademarks*